(12) United States Patent
Hsu

(10) Patent No.: US 11,953,734 B2
(45) Date of Patent: Apr. 9, 2024

(54) FIBER OPTIC ADAPTER

(71) Applicant: Gloriole Electroptic Technology Corp., Kaohsiung (TW)

(72) Inventor: Hsien-Hsin Hsu, Kaohsiung (TW)

(73) Assignee: GLORIOLE ELECTROPTIC TECHNOLOGY CORP., Kaohsiung (TW)

( * ) Notice: Subject to any disclaimer, the term of this patent is extended or adjusted under 35 U.S.C. 154(b) by 54 days.

(21) Appl. No.: 17/569,225

(22) Filed: Jan. 5, 2022

(65) Prior Publication Data

US 2022/0236494 A1    Jul. 28, 2022

(30) Foreign Application Priority Data

Jan. 22, 2021   (TW) ................................. 110200828

(51) Int. Cl.
*G02B 6/38*   (2006.01)

(52) U.S. Cl.
CPC ......... *G02B 6/3831* (2013.01); *G02B 6/3825* (2013.01)

(58) Field of Classification Search
CPC ....................................................... G02B 6/38
USPC ........................................................... 385/92
See application file for complete search history.

(56) References Cited

U.S. PATENT DOCUMENTS

| | | | |
|---|---|---|---|
| 7,460,750 B2 * | 12/2008 | Durrant | G02B 6/32 385/35 |
| 9,575,263 B2 * | 2/2017 | Gurreri | G02B 6/3882 |
| 9,846,283 B2 * | 12/2017 | Pepe | G02B 6/3893 |
| 11,579,376 B2 * | 2/2023 | Nakane | B08B 9/00 |
| 11,686,912 B1 * | 6/2023 | Woodward | G02B 6/4455 385/135 |
| 11,733,466 B2 * | 8/2023 | Higley | G02B 6/3898 385/78 |
| 2016/0047994 A1 * | 2/2016 | Conner | G02B 6/3889 385/87 |
| 2017/0184798 A1 * | 6/2017 | Coenegracht | G02B 6/3831 |
| 2019/0018209 A1 * | 1/2019 | Takano | G02B 6/3825 |
| 2019/0064447 A1 * | 2/2019 | Chang | G02B 6/3825 |
| 2019/0154924 A1 * | 5/2019 | Chang | G02B 6/3825 |
| 2019/0235182 A1 * | 8/2019 | Cheng | G02B 6/3871 |
| 2020/0166716 A1 * | 5/2020 | Chang | G02B 6/4292 |
| 2020/0183097 A1 * | 6/2020 | Chang | G02B 6/3831 |
| 2021/0080671 A1 * | 3/2021 | Bell | G02B 6/4455 |
| 2021/0373254 A1 * | 12/2021 | Wong | G02B 6/3878 |
| 2022/0075126 A1 * | 3/2022 | Chang | G02B 6/3825 |
| 2023/0080980 A1 * | 3/2023 | Higley | G02B 6/3893 385/78 |

* cited by examiner

*Primary Examiner* — Kaveh C Kianni
(74) *Attorney, Agent, or Firm* — Muncy, Geissler, Olds & Lowe, P.C.

(57) ABSTRACT

A fiber optic adapter includes a shell body defining an inner space, a dividing wall dividing the inner space into two receptacles, an installation seat, and a securing seat. The installation seat and the securing seat are respectively located in the receptacles. The securing seat includes a plurality of base walls connected in pairs, a plurality of pairs of clamping walls, and a plurality of clenching walls. Each base wall cooperates with a respective pair of the clamping walls and a respective clenching wall to form a ring-shaped structure, with each adjacent two of the base wall, the pair of clamping walls and the clenching wall defining a gap therebetween.

4 Claims, 11 Drawing Sheets

FIBER OPTIC ADAPTER

CROSS-REFERENCE TO RELATED APPLICATION

This application claims priority to Taiwanese Utility Model Patent Application No. 110200828, filed on Jan. 22, 2021.

FIELD

The disclosure relates to an adapter, and more particularly to a fiber optic adapter for a fiber optic connector.

BACKGROUND

Referring to FIGS. 1 and 2, a conventional fiber optic adapter 1 adapted for connection with a fiber optic connector with a four-channel QSFP (Quad Small Form-factor Pluggable) interface is shown. The fiber optic adapter 1 includes a housing 11, two flanges 12 respectively protruding outwardly from left and right sides of the housing 11, a partition wall 13 disposed inside the housing 11, a mounting seat 14 protruding from one surface of the partition wall 13, and a fixing seat 15 disposed on another surface of the partition wall 13 and projecting from the partition wall 13 toward a direction opposite to the mounting seat 14. The flanges 12 may be installed on specific locations through bolts, or for connecting with the flanges 12 of other conventional fiber optic adapters 1. The mounting seat 14 defines a plurality of through holes 141. The fixing seat 15 defines a plurality of bore holes 151 that are in spatial communication with the through holes 141, respectively. The fixing seat 15 includes six base walls 152 arranged in pairs, and twelve clamping walls 153 disposed correspondingly to the base walls 152. Each base wall 152 and two corresponding clamping walls 153 surround to form a ring-shaped structure with three gaps, and define one of the aforesaid bore holes 151. The conventional fiber optic adapter 1 is used for insertion by at least one corresponding set of two of the fiber optic connectors therein, so that the two fiber optic connectors of the at least one corresponding set are optically connected to each other through the through holes 141 and the bore holes 151.

However, when the conventional fiber optic adapter 1 is formed in a mold during manufacture, the ring-shaped structure, formed from the each base wall 152 and two corresponding clamping walls 153, makes the conventional fiber optic adapter 1 not easy to demold, so that it is necessary to forcibly demold the conventional fiber optic adapter 1. The clamping walls 153 needs to be forced apart during the forcibly demolding, and the clamping walls 153 will not be restored to their original configuration until after demolding. The aforementioned procedure is likely to cause the clamping walls 153 to deviate from its original position and generate errors, thus there is still room for improvement.

SUMMARY

Therefore, an object of the disclosure is to provide a fiber optic adapter that is manufactured without being forcibly demolded.

According to the disclosure, a fiber optic adapter includes a shell body, a dividing wall, an installation seat, and a securing seat. The shell body defines an inner space that extends in a front-rear direction. The dividing wall is disposed in the inner space and divides the inner space into two receptacles that are arranged in the front-rear direction. The dividing wall is formed with a plurality of bore holes that communicate with the receptacles. The installation seat is disposed on a surface of the dividing wall, is located in one of the receptacles, and defines a plurality of through holes that respectively communicate with the bore holes. The securing seat is disposed on another surface of the dividing wall and is located in another one of the receptacles. The securing seat includes a plurality of base walls that are connected in pairs, a plurality of pairs of clamping walls, and a plurality of clenching walls. Each one of the base walls cooperates with a respective one pair of the clamping walls and a respective one of the clenching walls to form a ring-shaped structure, with each adjacent two of the base walls, the pair of clamping walls and the clenching wall defining a gap therebetween. The ring-shaped structure defines a communicating hole that communicates with a respective one of the bore holes of the dividing wall.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
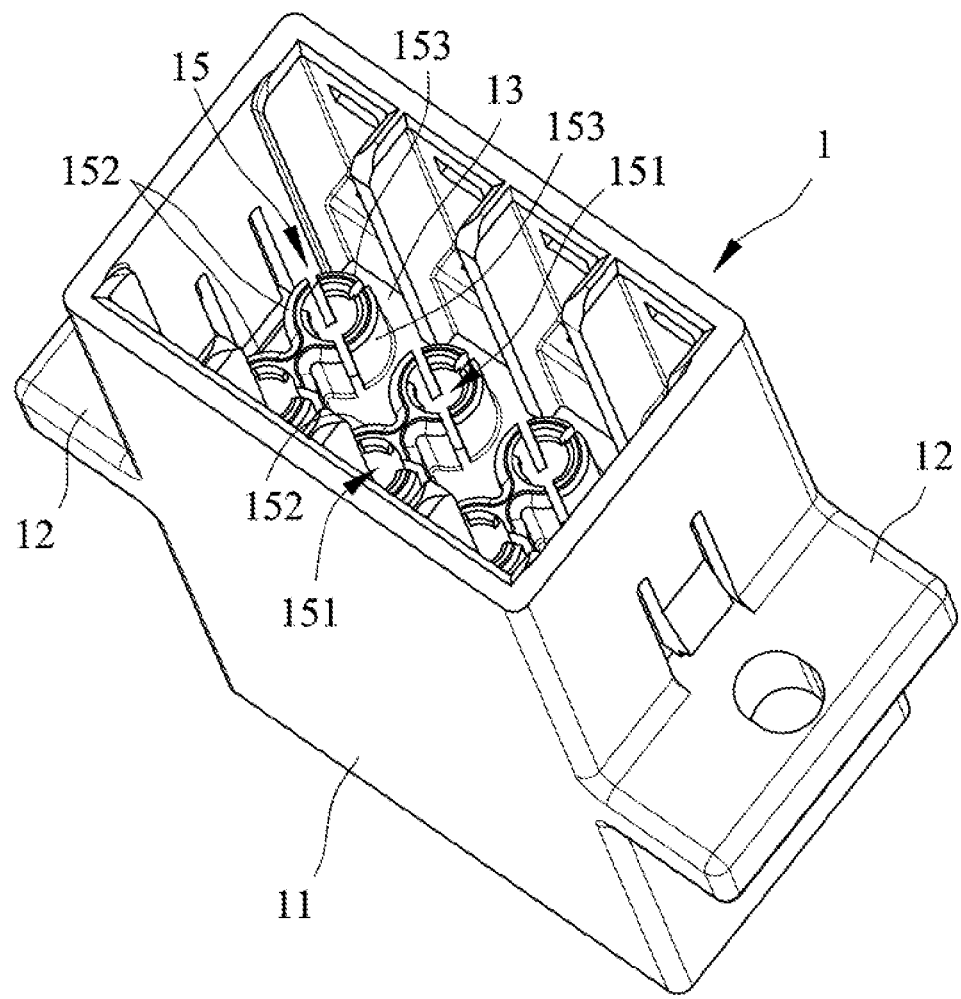
FIG. 1 is a perspective view of a conventional fiber optic adapter.
Figure 2:
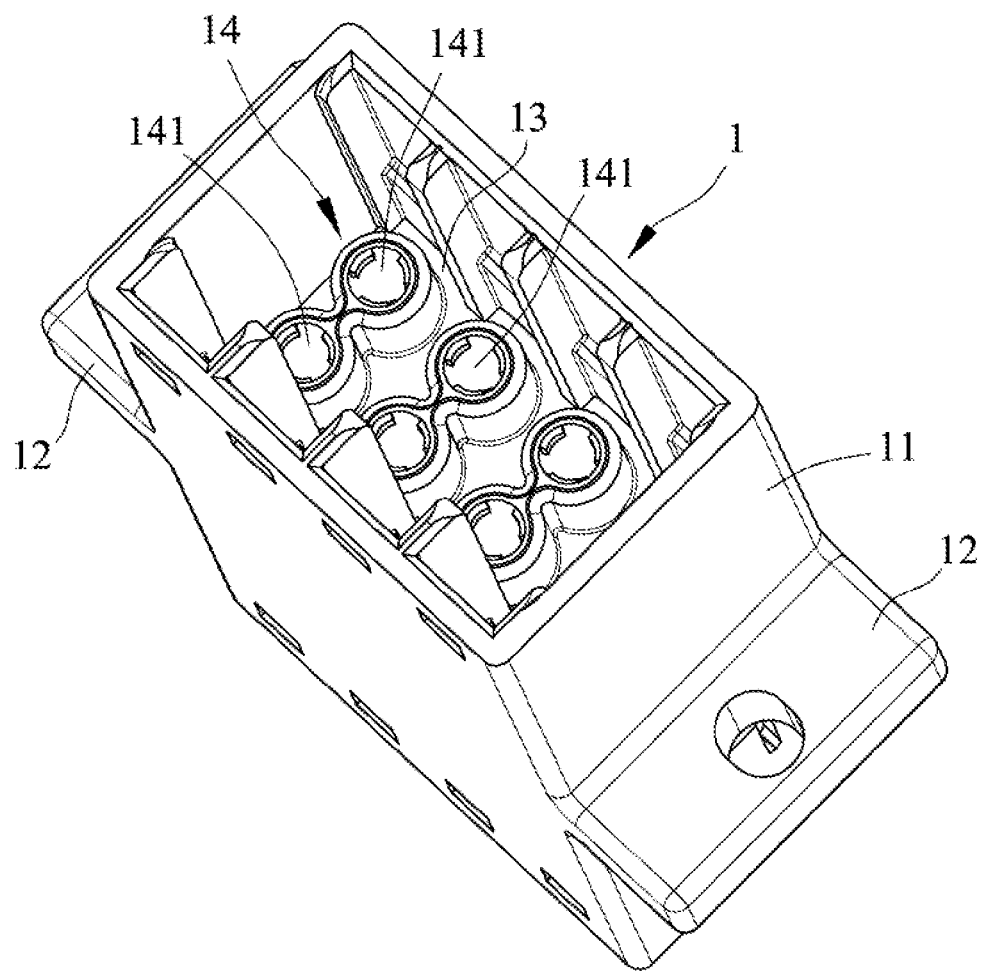
FIG. 2 is a perspective view of another angle of the conventional fiber optic adapter.

Before the present disclosure is described in detail, it should be noted that similar elements are denoted by the same reference numerals in the following description.

Figure 3:
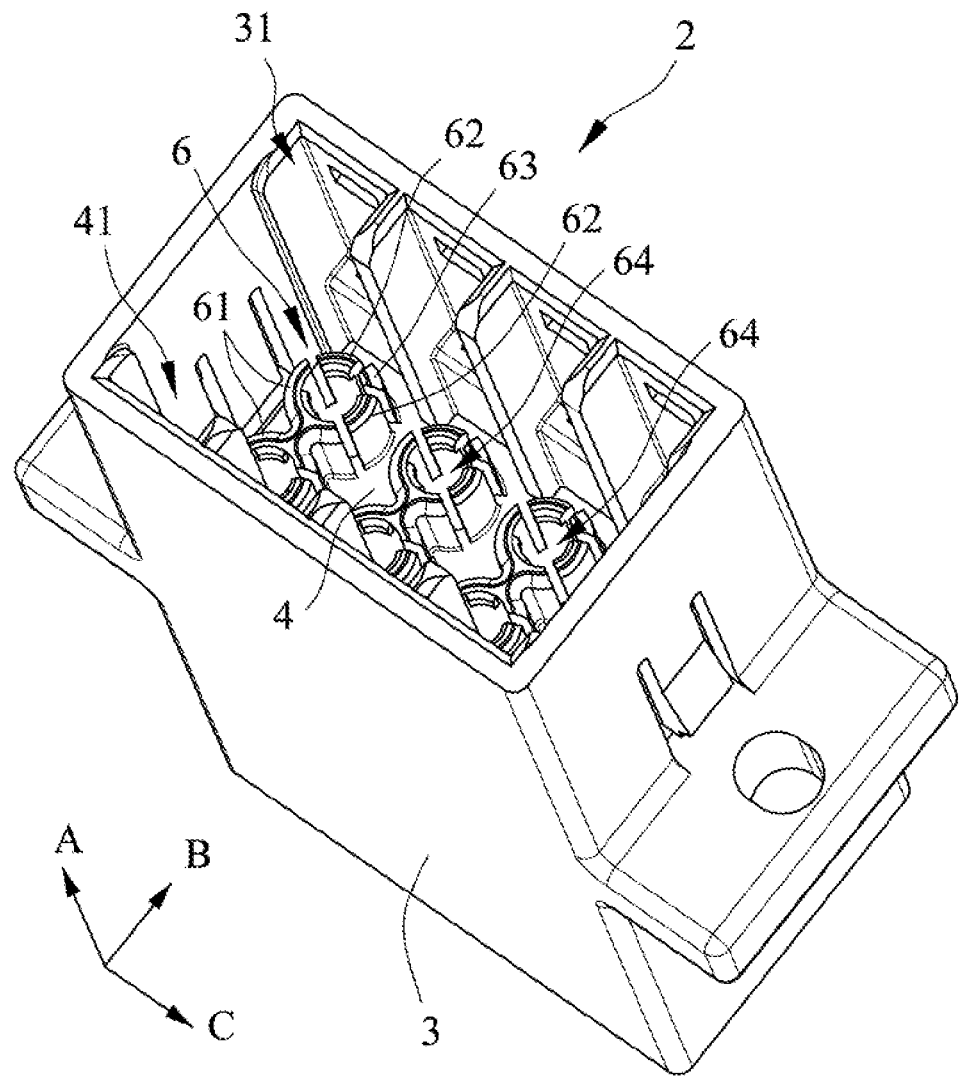
FIG. 3 is a perspective view of a first embodiment of a fiber optic adapter according to the present disclosure.
Figure 4:
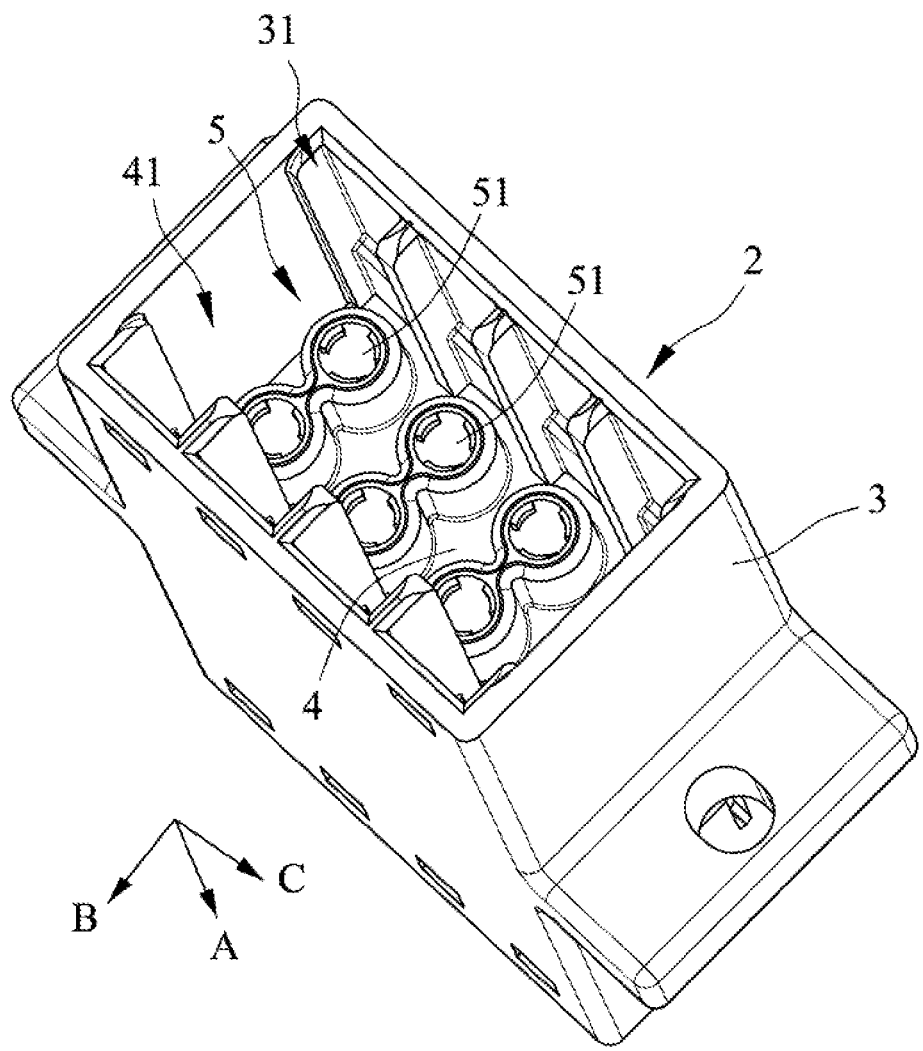
FIG. 4 is a perspective view of the first embodiment taken from a different angle from FIG. 3 in a front-rear direction.
Figure 5:
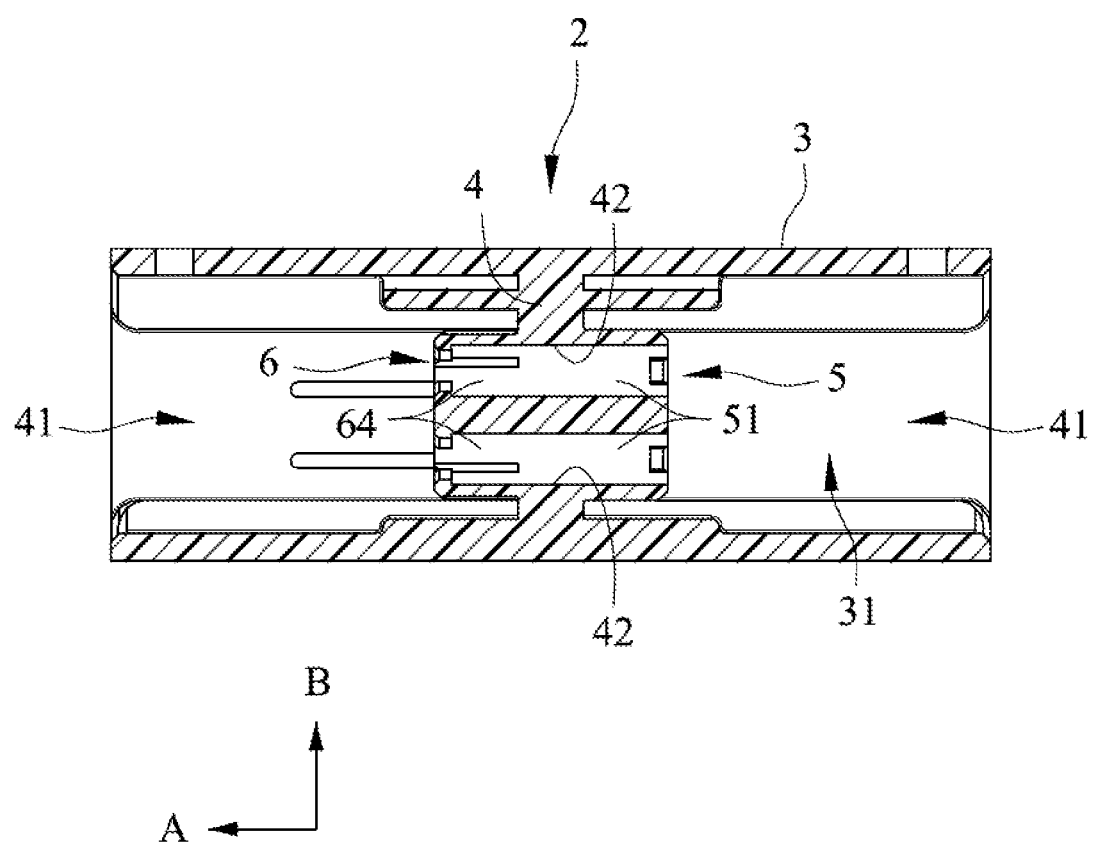
FIG. 5 is a sectional side view of the first embodiment.

Referring to FIGS. 3, 4, and 5, a first embodiment of the fiber optic adapter 2 according to the present disclosure is shown. First a front-rear direction (A), an up-down direction (B), and a left-right direction (C) which are perpendicular to each other are defined. The fiber optic adapter 2 includes a shell body 3, a dividing wall 4 disposed in the shell body 3, an installation seat 5 disposed in the shell body 3, and a securing seat 6 disposed in the shell body 3.

The shell body 3 defines an inner space 31 that extends in the front-rear direction (A). The dividing wall 4 is disposed in the inner space 31 of the shell body 3 and divides the inner space 31 into two receptacles 41 that are arranged in the front-rear direction (A). The dividing wall 4 is formed with a plurality of bore holes 42 that communicate with the receptacles 41. The installation seat 5 is disposed on a surface of the dividing wall 4, is located in one of the receptacles 41, and defines a plurality of through holes 51 that respectively communicate with the bore holes 42. The securing seat 6 is disposed on another surface of the dividing wall 4, and is located in another one of the receptacles 41. The securing seat 6 includes a plurality of base walls 61 that are connected in pairs, a plurality of pairs of clamping walls 62, and a plurality of clenching walls 63. The base walls 61, the clamping walls 62 and the clenching walls 63 are all extending forwardly from the dividing wall 4 in the front-rear direction (A) (see FIG. 3) with a curved cross-section. Each one of the base walls 61 cooperates with a respective one pair of the clamping walls 62 and a respective one of the clenching walls 63 to form a ring-shaped structure, with the respective one of the clenching walls 63 being disposed between the respective one pair of the clamping walls 62. The ring-shaped structure defines a communicating hole 64 that communicates with a respective one of the bore holes 42 of the dividing wall 4. In this embodiment, the number of the base walls 61 of the securing seat 6 is six, each pair of the base walls 61 that are connected to each other are arranged in the up-down direction (B), and the pairs of the base walls 61 that are spaced apart are arranged in the left-right direction (C).

Each adjacent two of the base walls 61, the pair of clamping walls 62 and the clenching wall 63 defines a gap therebetween. In the first embodiment, the ring-shaped structure has a three-bladed design with four gaps. By having the gaps, the clamping walls 62 and the clenching wall 63 have comparatively higher elastic flexibility, and can therefore reduce the force required for demolding, making the fiber optic adapter 2 easy to demold without resorting to forcibly demolding which forcefully pulls the mold away, thereby ensuring that the clamping walls 62 and the clenching wall 63 will not be deformed after demolding.

Figure 6:
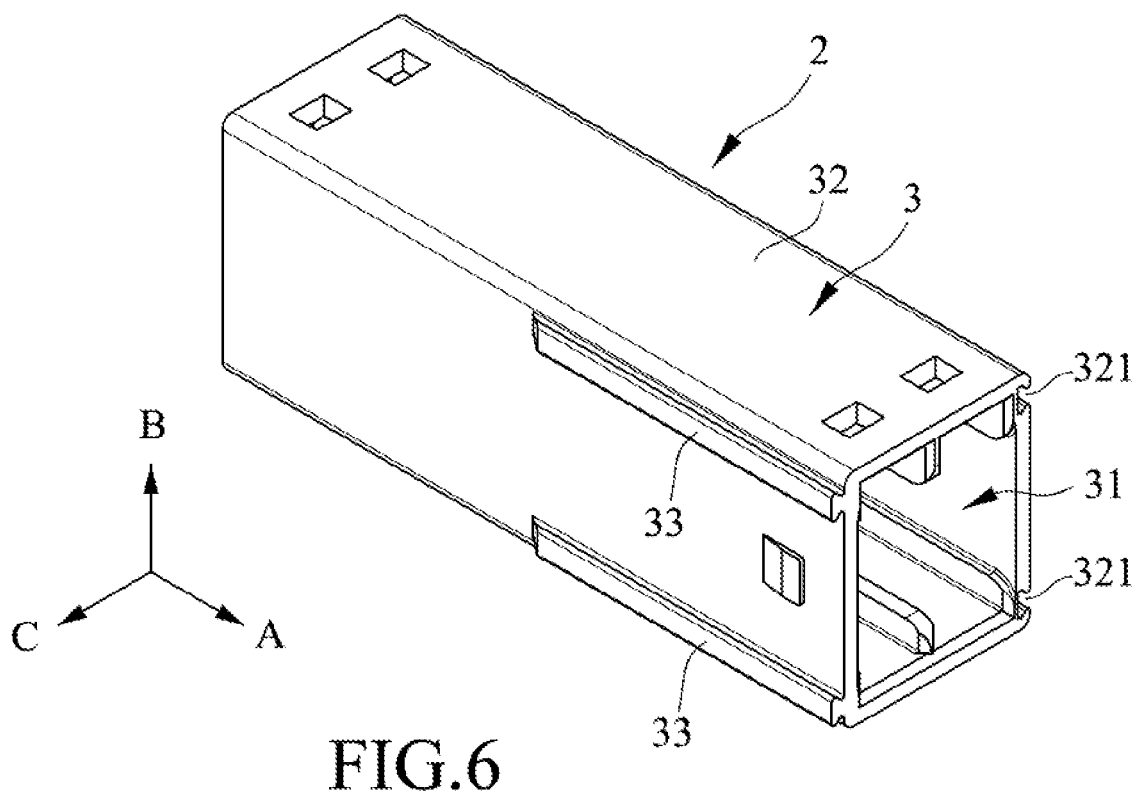
FIG. 6 is a perspective view of a second embodiment of the fiber optic adapter according to the present disclosure.
Figure 7:
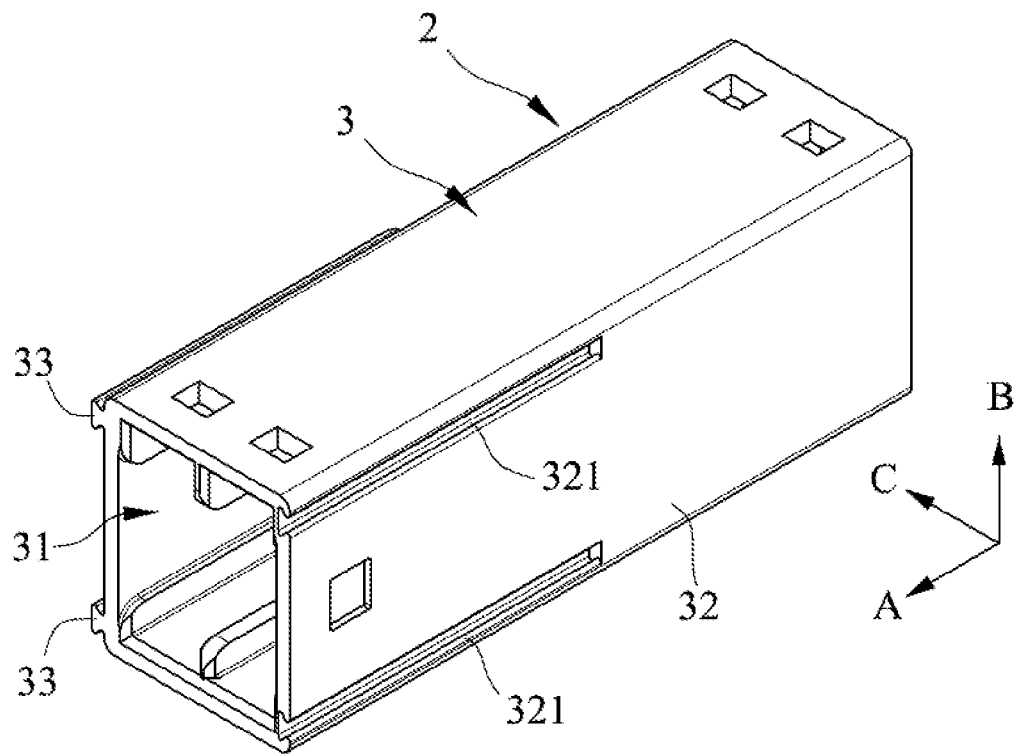
FIG. 7 is a perspective view of the second embodiment taken from an angle different from that of FIG. 6 in a front-rear direction.
Figure 8:
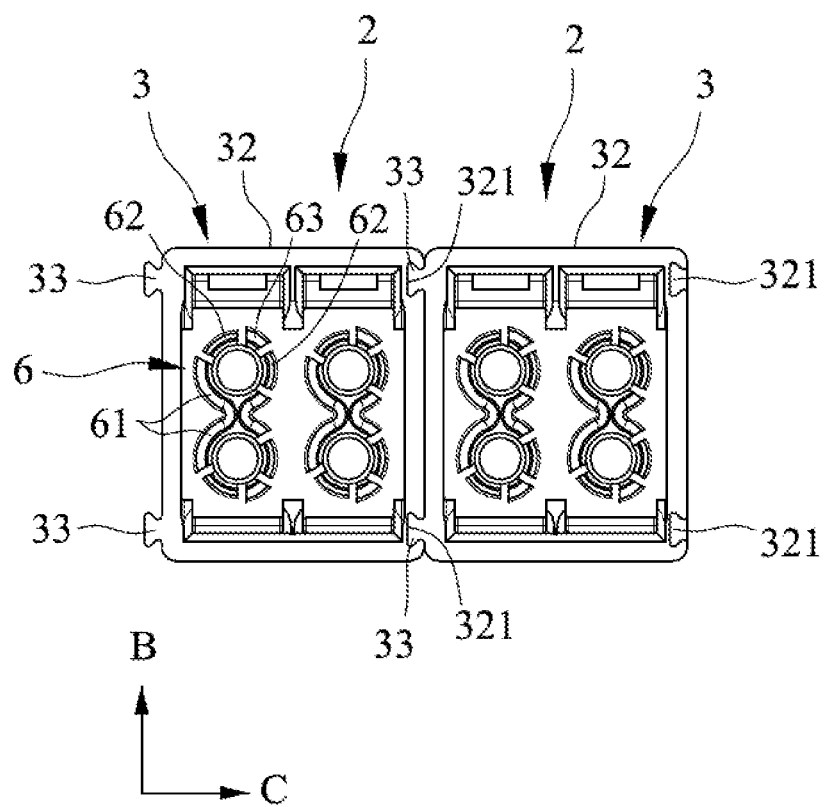
FIG. 8 is a front view of two of the second embodiments coupled together.
Figure 9:
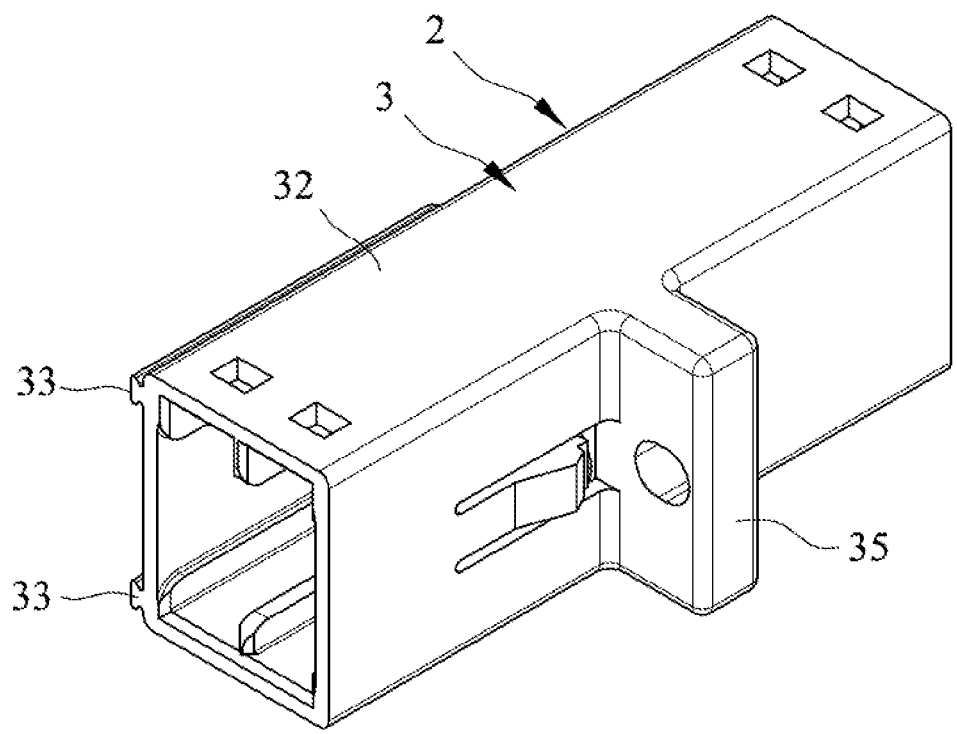
FIGS. 9 and 10 are perspective views illustrating another form of the second embodiment.
Figure 10:
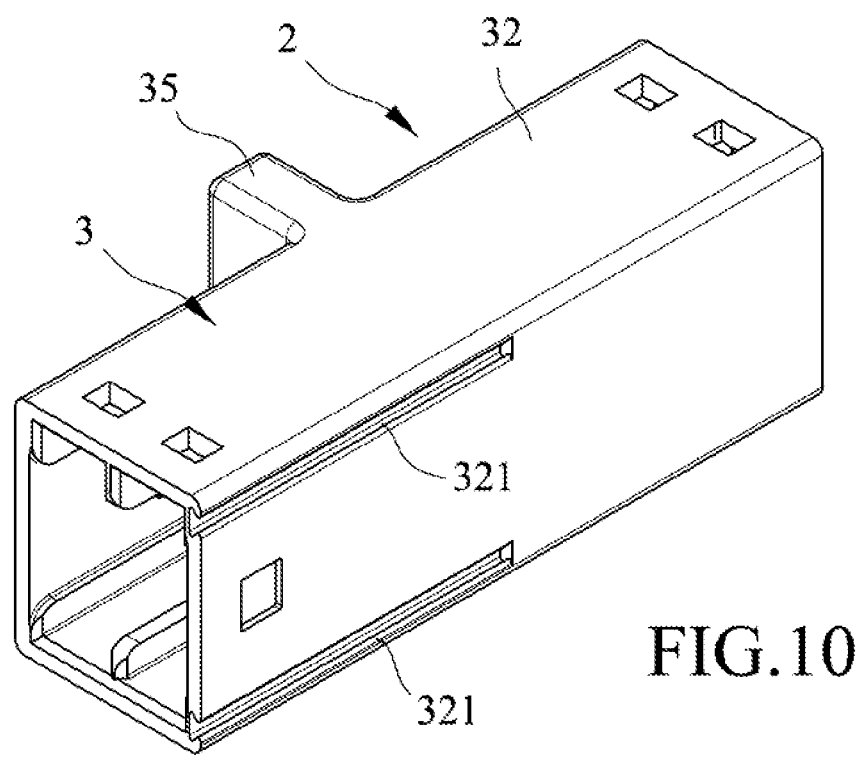
Figure 11:
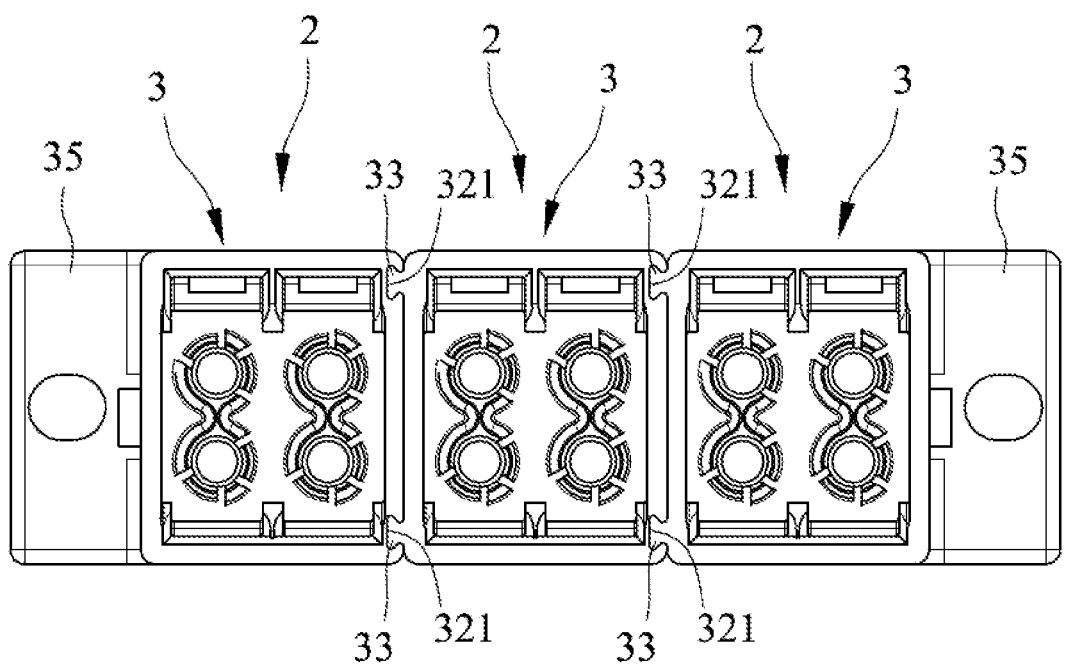
FIG. 11 is a front view of a plurality of the fiber optic adapters of FIGS. 9 and 10 coupled together.

Referring to FIGS. 6, 7, and 8, a second embodiment of the fiber optic adapter 2 of the present disclosure is shown to have substantially the same structure as the first embodiment, except for the following: The shell body 3 includes a main wall portion 32 surrounding the inner space 31 and having two opposite sides in the left-right direction (C), and a plurality of guiding rail portions 33 protruding from one of the sides of the main wall portion 32. The guiding rail portions 33 are spaced apart in the up-down direction (B), and each of the guiding rail portions 33 is elongated in the front-rear direction (A). In addition to this, the main wall portion 32 is formed with a plurality of guiding grooves 321 in the other one of the sides of the main wall portion 32. The guiding grooves 321 are spaced apart in the up-down direction (B), and each guiding groove 321 is elongated in the front-rear direction (A). Unlike the conventional fiber optic adapter, the second embodiment is not disposed with flanges for connection on both sides of the main wall portion 32, but instead, the guiding rail portions 33 are adapted to be engaged respectively with the guiding grooves 321 of another fiber optic adapter 2, and the guiding grooves 321 are adapted to be engaged respectively with the guiding rail portions 33 of another fiber optic adapter 2 as shown in FIG. 8, to connect a plurality of the fiber optic adapters 2 in a parallel connection in the left-right direction (C). Through the guiding rail portions 33 installing into the guiding grooves 321 without occupying any additional space in the left-right direction (C), the main wall portions 32 of the fiber optic adapters 2 can be placed side by side for a closer arrangement, so that it can be applied to narrower spaces. Referring to FIGS. 9, 10 and 11, it should be particularly noted that, when the fiber optic adapter 2 is adapted to be connected to a structure which has a flange, as shown in FIG. 9 or FIG. 10, the fiber optic adapter 2 may be provided with a flange 35 on one side, and the guiding rail portions 33 or the guiding grooves 321 are disposed on the other side. The different configurations of the fiber optic adapter 2 are interconnected to each other through the guiding rail portions 33 and the guiding grooves 321 that are disposed according to different requirements to enhance universality.

Figure 12:
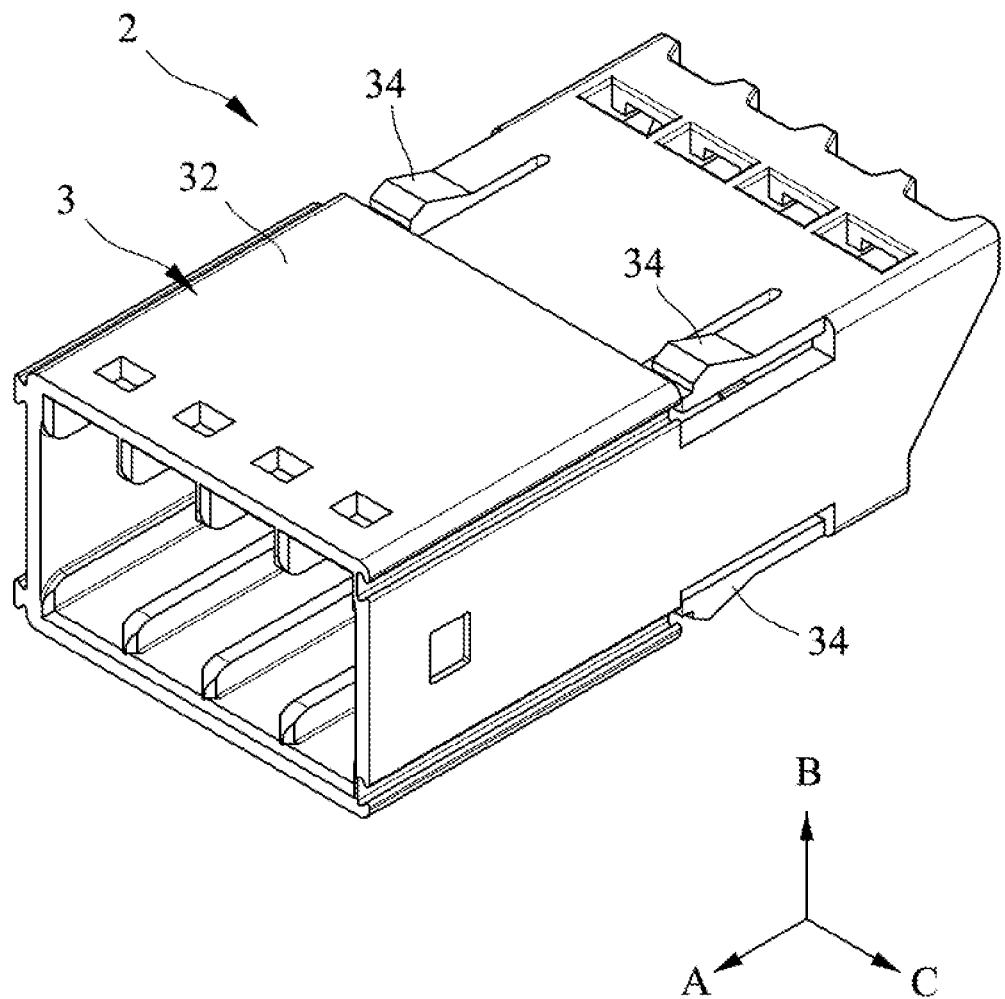
FIG. 12 is a perspective view of a third embodiment of the fiber optic adapter according to the present disclosure.
Figure 13:
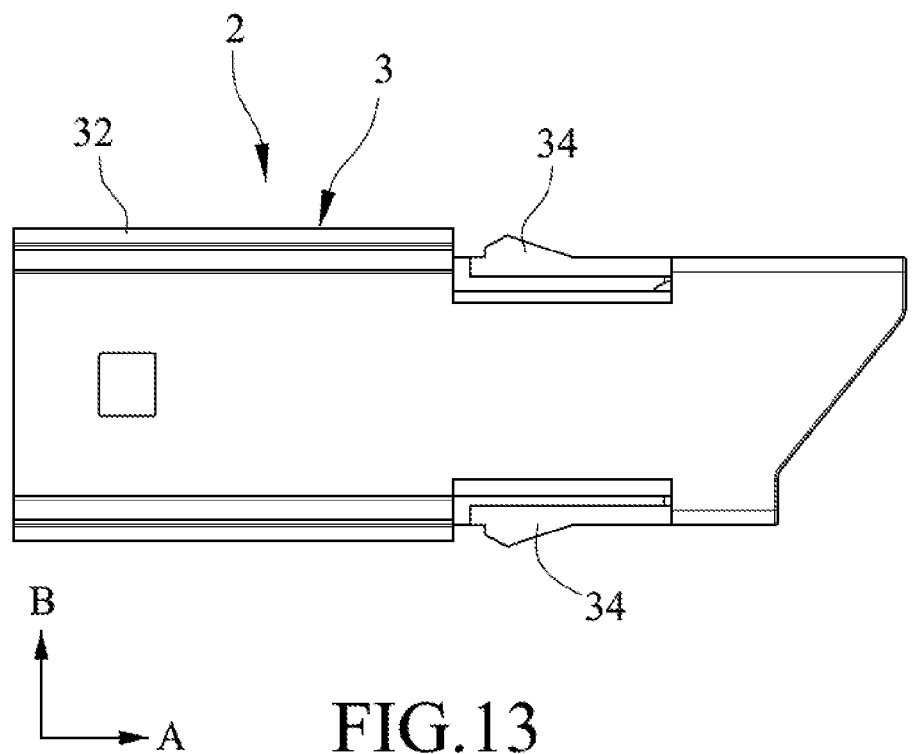
FIG. 13 is a side view of the third embodiment.

Referring to FIGS. 12 and 13, a third embodiment of the fiber optic adapter 2 according to the present disclosure is shown to be generally identical to the structure of the second embodiment.

Figure 14:
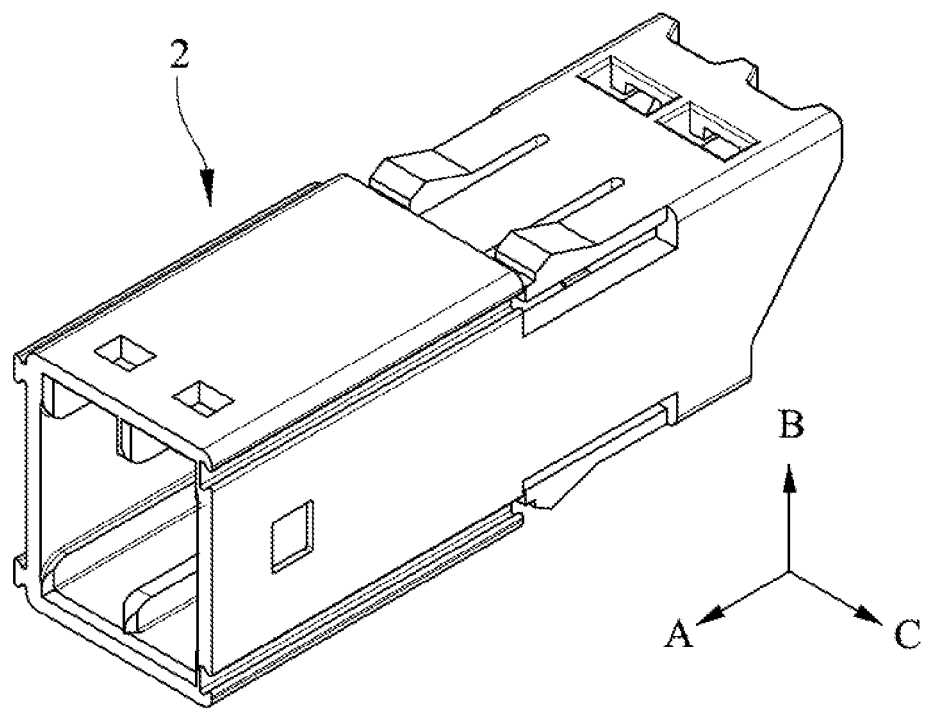
FIG. 14 is a perspective view, illustrating another form of the third embodiment.

The differences are that the shell body 3 includes a plurality of clasp portions 34 protruding from two sides of the main wall portion 32. In the third embodiment, the shell body 3 further includes four clasp portions 34 in two sets of two. The two sets of clasp portions 34 respectively project from two opposite sides of the main wall portion 32 in the up-down direction (B). The two clasp portions 34 that are disposed at the same side of the main wall portion 32 are spaced apart from each other in the left-right direction (C), and each clasp portion 34 is elongated in the front-rear direction (A). When it is desired to mount the third embodiment in a slot of a computer case or other device, the clasp portions 34 may push outwardly on a surrounding wall which defines the slot when the main wall portion 32 is inserted into the slot, and an auxiliary supporting effect can be achieved. In doing so, the third embodiment does not need to rely on any flange for securing, thereby achieving the effect of having a compact configuration. Referring to FIG. 14, the third embodiment may be designed to have a reduced width in the left-right direction (C), if the through holes 51 (see FIG. 4) of the installation seat 5 and the communicating holes 64 (see FIG. 3) of the securing seat 6 are designed to be fewer in number to correspond with the amount of required connections.

In summary, the present fiber optic adapter 2 does not need to be forcibly demolded, thus ensuring that the clamping walls 62 and the clenching walls 63 are not displaced, thereby ensuring that the molded communicating holes 64 are standardized in size and not offset in position. Furthermore, various configurations are also provided and a compact arrangement can thereby be achieved. Therefore, the object of the present invention can certainly be achieved.

However, the above is merely an embodiment of the present disclosure, and certainly should not be limited to the scope of practicing the present disclosure. Any equivalent variation and modification made according to the claims of the present disclosure and the content of the present disclosure should still fall within the scope covered by the present disclosure.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fiber optic adapter comprising:
a shell body defining an inner space that extends in a front-rear direction;
a dividing wall disposed in said inner space and dividing said inner space into two receptacles that are arranged in the front-rear direction, said dividing wall being formed with a plurality of bore holes that communicate with said receptacles;
an installation seat disposed on a surface of said dividing wall, located in one of said receptacles, and defining a plurality of through holes that respectively communicate with said bore holes; and
a securing seat disposed on another surface of said dividing wall and located in another one of said receptacles, said securing seat including a plurality of base walls that are connected in pairs, a plurality of pairs of clamping walls, and a plurality of clenching walls, each one of said base walls cooperating with a respective one pair of said clamping walls and a respective one of said clenching walls to form a ring-shaped structure, with each adjacent two of said base wall, said pair of clamping walls and said clenching wall defining a gap therebetween, said ring-shaped structure defining a communicating hole that communicates with a respective one of said bore holes of said dividing wall;
wherein each pair of said base walls that are connected to each other are arranged in an up-down direction which is perpendicular to the front-rear direction, the pairs of said base walls that are spaced apart being arranged in a left-right direction which is perpendicular to the front-rear direction and the up-down direction; and
wherein said shell body includes a main wall portion surrounding said inner space and having two opposite sides in the left-right direction, and a plurality of guiding rail portions protruding from one of said sides of said main wall portion, said guiding rail portions being spaced apart in the up-down direction, each of said guiding rail portions being elongated in the front-rear direction.

2. The fiber optic adapter as claimed in claim 1, wherein said main wall portion is formed with a plurality of guiding grooves in the other one of said sides of said main wall portion, said guiding grooves being spaced apart in the up-down direction, each guiding groove being elongated in the front-rear direction.

3. A fiber optic adapter comprising:
a shell body defining an inner space that extends in a front-rear direction;
a dividing wall disposed in said inner space and dividing said inner space into two receptacles that are arranged in the front-rear direction, said dividing wall being formed with a plurality of bore holes that communicate with said receptacles;
an installation seat disposed on a surface of said dividing wall, located in one of said receptacles, and defining a plurality of through holes that respectively communicate with said bore holes; and
a securing seat disposed on another surface of said dividing wall and located in another one of said receptacles, said securing seat including a plurality of base walls that are connected in pairs, a plurality of pairs of clamping walls, and a plurality of clenching walls, each one of said base walls cooperating with a respective one pair of said clamping walls and a respective one of said clenching walls to form a ring-shaped structure, with each adjacent two of said base wall, said pair of clamping walls and said clenching wall defining a gap therebetween, said ring-shaped structure defining a communicating hole that communicates with a respective one of said bore holes of said dividing wall;
wherein each pair of said base walls that are connected to each other are arranged in an up-down direction which is perpendicular to the front-rear direction, the pairs of said base walls that are spaced apart being arranged in a left-right direction which is perpendicular to the front-rear direction and the up-down direction; and
wherein said shell body includes a main wall portion surrounding said inner space and having opposite sides in the up-down direction, and a plurality of clasp portions protruding from said two sides of said main wall portion.

4. A fiber optic adapter comprising:
a shell body defining an inner space that extends in a front-rear direction;
a dividing wall disposed in said inner space and dividing said inner space into two receptacles that are arranged in the front-rear direction, said dividing wall being formed with a plurality of bore holes that communicate with said receptacles;
an installation seat disposed on a surface of said dividing wall, located in one of said receptacles, and defining a plurality of through holes that respectively communicate with said bore holes; and
a securing seat disposed on another surface of said dividing wall and located in another one of said receptacles, said securing seat including a plurality of base walls that are connected in pairs, a plurality of pairs of clamping walls, and a plurality of clenching walls, each one of said base walls cooperating with a respective one pair of said clamping walls and a respective one of said clenching walls to form a ring-shaped structure, with each adjacent two of said base wall, said pair of clamping walls and said clenching wall defining a gap therebetween, said ring-shaped structure defining a communicating hole that communicates with a respective one of said bore holes of said dividing wall;
wherein each pair of said base walls that are connected to each other are arranged in an up-down direction which is perpendicular to the front-rear direction, the pairs of said base walls that are spaced apart being arranged in a left-right direction which is perpendicular to the front-rear direction and the up-down direction;
wherein said shell body includes a main wall portion surrounding said inner space and having opposite sides in the left-right direction, and a plurality of guiding rail portions protruding from one of said sides of said main wall portion, said guiding rail portions being spaced apart in the up-down direction, each guiding rail portion being elongated in the front-rear direction;

wherein said main wall portion is formed with a plurality of guiding grooves in the other one of said sides of said main wall portion, said guiding grooves being spaced apart in the up-down direction, each guiding groove being elongated in the front-rear direction; and wherein said guiding rail portions are adapted to be engaged respectively with said guiding grooves of another fiber optic adapter, and said guiding grooves are adapted to be engaged respectively with said guiding rail portions of another fiber optic adapter.

\* \* \* \* \*